Figure 1:
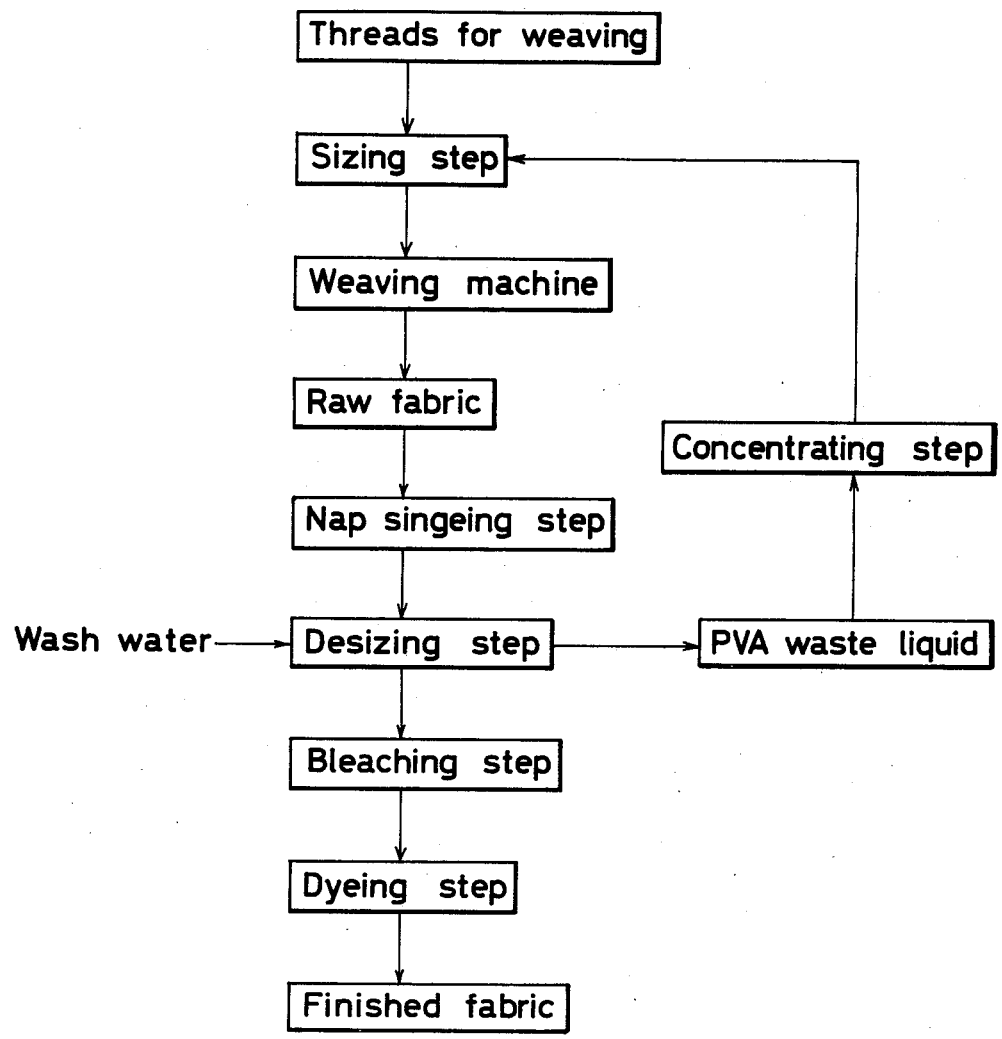

United States Patent [19]

Mabuchi et al.

[11] 4,289,577
[45] Sep. 15, 1981

[54] APPARATUS FOR CONCENTRATING POLYVINYL ALCOHOL SOLUTION

[75] Inventors: Katsuya Mabuchi; Shigeyuki Yamamoto, both of Toyonaka, Japan

[73] Assignee: Toyo Boseki Kabushiki Kaisha, Osaka, Japan

[21] Appl. No.: 108,574

[22] Filed: Dec. 31, 1979

[30] Foreign Application Priority Data

May 16, 1978 [JP] Japan .................................. 53-58539

[51] Int. Cl.³ .............................................. B01D 1/12
[52] U.S. Cl. ........................................ 159/5; 159/44; 159/49; 159/DIG. 10
[58] Field of Search .................... 525/56, 62; 528/501; 137/92; 203/89, 91, 94, 98, DIG. 6; 202/236; 159/DIG. 10, DIG. 15, 5, 6 W, 6 WH, 49, 13 R, 13 A, 13 B, 44

[56] References Cited

U.S. PATENT DOCUMENTS 2,711,750  6/1955  Norcross ................................. 137/92
3,553,248  1/1971  Wakita et al. .......................... 528/501

OTHER PUBLICATIONS

"Viscosity Control in a Thin Layer Evaporator"; Schneider; Automatisierungspraxis (Germany); vol. 13, No. 7; pp. 129-132;(1970).

*Primary Examiner*—Frank Sever

*Attorney, Agent, or Firm*—Armstrong, Nikaido, Marmelstein & Kubovcik

[57] ABSTRACT

An apparatus for concentrating polyvinyl alcohol liquid which comprises a supply line for supplying a liquid containing polyvinyl alcohol, a filter in connection with the supply line for filtering foreign materials from the liquid, a first tank for receiving the liquid after the liquid is passed through the filter, a preliminary mixing apparatus in fluid connection with the first tank, an evaporator in fluid connection with the preliminary mixing apparatus, the evaporator including a plurality of pipes through which the liquid may flow, a steam heating assembly in connection with the evaporator for heating the liquid flowing through the plurality of pipes, a second tank in fluid connection with the evaporator, the second tank receiving the liquid from the plurality of pipes within the evaporator, a return pipe in fluid connection with the second tank for returning liquid contained within the second tank to the preliminary mixing apparatus such that the liquid may be combined within the preliminary mixing apparatus with the liquid from the first tank, an outlet pipe in fluid connection with the second tank, a viscometer in connection with the outlet pipe, a regulating valve within the outlet pipe with the regulating valve being controlled by signals from the viscometer, and a pipe for leading vaporized polyvinyl alcohol waste liquid outwardly from the evaporator. The polyvinyl alcohol liquid is thereby recovered and made re-usable for sizing of fabrics.

1 Claim, 2 Drawing Figures

APPARATUS FOR CONCENTRATING POLYVINYL ALCOHOL SOLUTION

The present invention relates to an apparatus for concentrating an aqueous solution of polyvinyl alcohol (hereinafter referred to as PVA), and more specifically to an apparatus for concentrating PVA in the form of liquid by heating a waste liquid containing PVA.

Heretofore, PVA has been used as a warp size, fabric processing agent or adhesive, and among others, it is widely used as a warp size because of its water-solubility and physical properties of dry film. A fabric woven from warp threads sized with such a size is desized prior to scouring and bleaching.

Needless to say, the purpose of sizing warp threads is to stick the fibers together which form the yarn to strengthen it, and to hold down fluffs to increase weaving efficiency.

A large amount of PVA, etc. is present in the waste liquid coming from the desizing step, and it has been a big problem to discharge such a PVA waste liquid into rivers or the like because it has a high COD value.

Consequently, there have been proposed various methods or recovering PVA from PVA waste liquids to lower the COD value in the discharged water, for example, methods of separating PVA by agglomeration.

Thus, there are known the following methods including a method of separating PVA from a waste liquid of PVA by agglomeration wherein an organic solvent such as acetone is added to the liquid; a method wherein PVA is salted out with a salt such as sodium sulfate; a method wherein boric acid or borax is added; a chelating method by a heavy metal salt such as a copper salt; etc.

However, all these methods suffer from disadvantages such that not only they require a large amount of chemicals, their PVA separation efficiency by agglomeration is insufficient, and the treatment cost is very high, but in addition, when a heavy metal is used, there may be caused a secondary environmental pollution by the heavy metal. Therefore, it has been difficult to put these methods into practical use.

Under these circumstances, there has been proposed a method of recovering PVA (Japanese Patent Application No. 59484/1976), wherein after a PVA waste liquid is concentrated to a concentration of 2-15%, preferably 5-10%, PVA is recovered by spray-drying, which is characterized by regulating the starch concentration in said PVA waste liquid to 5-45% based on the concentration of PVA. The recovery of PVA in the form of powder in this way is quite useful from the viewpoint of reuse and prevention of environmental pollution. However, the pulverization of PVA has some disadvantages in cost and in operation of suitably regulating the starch concentration.

We have now found an apparatus for concentrating a PVA waste liquid to obtain a PVA concentrate which can be reused as such for sizing.

A PVA waste liquid generally contains starch, etc. besides PVA, and therefore it is very difficult to concentrate the liquid because of its viscosity. Accordingly, some contrivance was necessary in this respect.

To attain such objects, the present invention has the following construction. Thus, the apparatus of the present invention comprises at least one evaporator; a filter equipment; a feed pipe for introducing a PVA waste liquid that has passed through said filter equipment into said evaporator; a return pipe for reintroducing the PVA waste liquid after concentration into said evaporator; a preliminary mixing apparatus for previously mixing the PVA waste liquid coming from said feed pipe and said return pipe, upon feeding said waste liquid to said evaporator; and outlet pipe for discharging the PVA waste liquid after concentration exteriorly of said evaporator; a viscometer equipped in the passageway of said outlet pipe; a regulating valve controlled by signals from said viscometer; and a pipe for leading the steam of the PVA waste liquid exteriorly of said evaporator; the heating of the PVA waste liquid being effected by steam.

Figure 2:
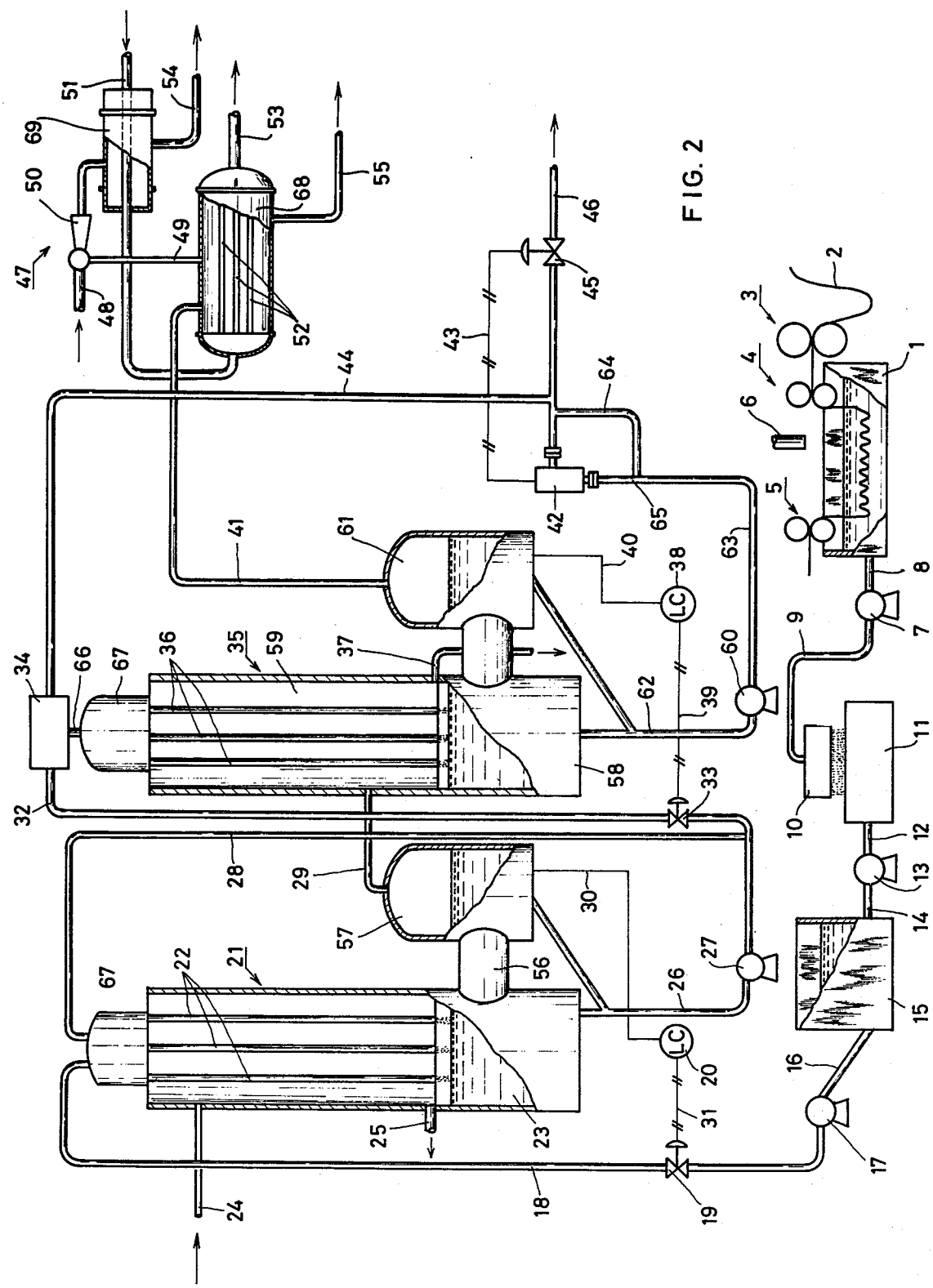

The invention will be further explained in the following by referring to the drawings wherein:

FIG. 1 is a schematic diagram showing the steps of the use of a PVA liquid as a sizing agent, recovery and reuse thereof; and FIG. 2 is a schematic view of an apparatus embodying the present invention.

Referring to FIG. 2, the reference numeral 1 indicates a desizing apparatus, in which a fabric 2 is desized while being drawn by drawing rollers 3, 4 and 5. Reference numeral 6 indicates an equipment for supplying wash water. Reference numeral 10 is a filter equipment in which the PVA waste liquid introduced through pipes 8 and 9 by a pump 7 is removed from foreign matter such as waste thread. The filter members used in the filter equipment 10 may be wire nets, etc. and are not particularly limited so far as they have a filtering effect. The filter members are preferably vibrated horizontally or vertically to remove foreign matter effectively, such as waste thread. Reference numeral 11 is a tank, 12 and 14 are pipes and 13 is a pump. Reference numeral 15 is a feed tank in which the PVA waste liquid removed from foreign matter such as waste thread is stored. Feed pipe 18 is connected with a pump 17 at one end, and the other end is connected with an evaporator 21. Reference numeral 22 indicates pipes through which the PVA waste liquid passes. Reference numeral 24 is a steam-introducing pipe through which steam is introduced in the direction of the arrow in the evaporator 21 to heat pipes 22 in said evaporator 21, and the steam is discharged from a drain pipe 25. The PVA waste liquid which has passed through the pipes 22 is stored in a tank 23 positioned under the evaporator 21. The tank 23 is connected with a tank 57 by a conduit 56. One end of pipe 29 opens at the top of the tank 57 and the other end opens to the steam passage 59 of another evaporator 35 so that the steam from the PVA waste liquid can heat pipes 36. Reference numeral 20 is a level controller. The liquid level in the tank 57 is detected by a detector 30, and the degree of openness of a regulating valve 19 is adjusted by signal tube 31 so as to control the liquid level. Although evaporators of thin film descending type are shown in the drawing, other types of evaporators can also be used. A part of water in the PVA waste liquid heated to above the boiling point by heated steam turns into steam and is introduced into the neighboring evaporator 35 through the pipe 29. The consequence is that the PVA waste liquid concentrated to some degree is returned to the evaporator 21 through pipe 26 and through return pipe 28 by pump 27, and at the same time, a part of the liquid is supplied to preliminary mixing apparatus 34 through feed pipe 32. Reference numeral 37 is a drain pipe. As in the case of the evaporator 21, the liquid level in tank 61 is controlled by a detector 40, level controller 38, signal tube 39 and regulating valve 33. If the liquid level rises too high, the PVA waste liquid flows back through pipes 22, 36, and if it falls too low, the flow of the PVA waste liquid in pipes 26, 62 becomes irregular. To avoid such a phenomenon, it is preferable to provide level controllers. Pipe 63 is branched into a pipe 64 and a pipe 65. After the pipes 64 and 65 are combined in one, it is branched again into an outlet pipe 46 and a return pipe 44. The return pipe 44 is connected with the preliminary mixing apparatus 34. Indicated with the numeral 66 is a pipe. The preliminary mixing apparatus 34 serves to mix previously the PVA waste liquid from feed pipe 32 and the concentrated PVA waste liquid from the return pipe 44 so as to prevent scorching in the pipes 36. Thus, one characteristic of the present invention is that a thick PVA waste liquid, which is difficult to be concentrated because of its high viscosity, can be concentrated without difficulty by mixing a thinner PVA waste liquid with the thicker PVA liquid uniformly. Reference numeral 67 indicates uniformly distributing apparatus. The reason why the pipe 64 is provided in parallel with the pipe 65 is to prevent an excess amount of the PVA waste liquid from flowing through viscometer 42. The viscometer 42 detects the viscosity of the PVA waste liquid, and when the viscosity reaches a predetermined viscosity, it causes regulating valve 45 to open by signal tube 43 so as to discharge the PVA waste liquid out of outlet pipe 46. The steam in the tank 61 is transferred through pipe 41 into main condenser 68 in which the steam is condensed. Reference numeral 47 indicates an ejector, into which uncondensed gas is introduced through pipe 49 and the gas, mixed with steam, is jetted into supplementary condenser 69. Reference numeral 50 indicates a pipe and 54, 55 indicate drain pipes. Reference numeral 51 indicates a cooling water feed pipe and reference numeral 53 indicates a cooling water discharge pipe. The cooling water feed pipe 51 is branched into three pipes 52 to increase the cooling effect, and the three pipes 52 are connected with the cooling water discharge pipe 53.

The apparatus as explained above works as follows. The PVA waste liquid in the desizing apparatus 1 having a concentration of about 1.3 weight % is supplied by the action of the pump 7 to the filter equipment, in which it is removed from foreign matter such as waste thread, etc.

The PVA waste liquid is then transferred by the action of the pump 13 from the tank 11 to the feed tank 15 in which the waste PVA liquid is stored. The PVA waste liquid in the feed tank 15 is transferred to the pipes 22 in the evaporator 21 by the action of the pump 17 through the feed pipe 18 and the uniformly distributing apparatus 67. At this time, steam at a temperature, for example, of 120° C. is supplied around the pipes 22 in the evaporator 21 through the steam-introducing pipe 24, and after the steam has heated the pipes 22, it is discharged out of the drain pipe 25. Since the PVA waste liquid is heated in this step, a part of water in the PVA waste liquid turns into steam, and the steam passes through the pipe 29 and heats the pipes 36 in the evaporator 35. Therefore, the PVA waste liquid is concentrated to some extent, and a part of it is supplied to the uniformly distributing apparatus 67 through the return pipe 28, and the remainder is supplied through the feed pipe 32 to the preliminary mixing apparatus 34 in order that it is further concentrated. Also in the case of the evaporator 35, a part of the concentrated PVA waste liquid is supplied through the return pipe 44 to the preliminary mixing apparatus 34, and the remainder is discharged through the regulating valve 45 out of the outlet pipe 46, when it is detected to have reached a predetermined viscosity, for example, about 100 CP by the viscometer 42. The PVA waste liquids of lower concentration and higher concentration are mixed intimately beforehand by the preliminary mixing apparatus 34 and the mixture is supplied to the uniformly distributing apparatus 67 through the pipe 66. Since the pipes 36, 36, 36 open respectively at the bottom of the uniformly distributing apparatus 67, the PVA waste liquid passes through the pipes 36 and is stored in the tank 58. The steam in the tank 61 is transferred through the pipe 41 to the main condenser 68, in which it is condensed, and uncondensed gas is further transferred into the supplementary condenser 69, in which it is condensed.

Thus, according to the present invention, the PVA waste liquid which is difficult to be concentrated can be stably concentrated to a predetermined concentration, and therefore the PVA waste liquid thus concentrated can be reused without anxiety in quality.

What we claim is:

1. An apparatus for concentrating polyvinyl alcohol liquid which comprises:
   a supply line for supplying a liquid containing polyvinyl alcohol;
   a filtering means in connection with said supply line for filtering foreign materials from said liquid;
   a first tank for receiving said liquid after said liquid has passed through said filtering means;
   a preliminary mixing apparatus in fluid connection with said first tank;
   an evaporator in fluid connection with said preliminary mixing apparatus, said evaporator including a plurality of pipes through which said liquid may flow;
   a steam heating means in connection with said evaporator for heating said liquid flowing through said plurality of pipes;
   a second tank in fluid connection with said evaporator, said second tank for receiving said liquid from said plurality of pipes within said evaporator;
   a return pipe in fluid connection with said second tank for returning liquid contained within said second tank to said preliminary mixing apparatus such that said liquid may be combined within said preliminary mixing apparatus with said liquid from said first tank;
   an outlet pipe in fluid connection with said second tank;
   a viscometer in connection with said outlet pipe;
   a regulating valve within said outlet pipe, said regulating valve being controlled by signals from said viscometer; and
   a pipe for leading vaporized polyvinyl alcohol waste liquid outwardly from said evaporator.

* * * * *